(12) United States Patent
Cohen et al.

(10) Patent No.: US 10,778,947 B2
(45) Date of Patent: *Sep. 15, 2020

(54) SYMPATHETIC ASSISTIVE MUTATION OF LIVE CAMERA PREVIEW/DISPLAY IMAGE STREAM

(71) Applicant: Filmic Inc., Seattle, WA (US)

(72) Inventors: Christopher Cohen, Seattle, WA (US); Matthew Voss, Seattle, WA (US); Neill Winston Barham, Seattle, WA (US)

(73) Assignee: FILMIC INC., Seattle, WA (US)

(*) Notice: Subject to any disclaimer, the term of this patent is extended or adjusted under 35 U.S.C. 154(b) by 275 days.

This patent is subject to a terminal disclaimer.

(21) Appl. No.: 15/914,673

(22) Filed: Mar. 7, 2018

(65) Prior Publication Data

US 2018/0262688 A1 Sep. 13, 2018

Related U.S. Application Data

(60) Provisional application No. 62/468,874, filed on Mar. 8, 2017, provisional application No. 62/468,063, filed on Mar. 7, 2017.

(51) Int. Cl.
*H04N 9/64* (2006.01)
*H04N 9/77* (2006.01)
(Continued)

(52) U.S. Cl.
CPC ............. *H04N 9/646* (2013.01); *G06T 5/002* (2013.01); *G06T 7/90* (2017.01); *H04N 5/23212* (2013.01);
(Continued)

(58) Field of Classification Search
CPC ........ H04N 9/646; H04N 9/77; H04N 17/002; H04N 5/2353; H04N 5/23293;
(Continued)

(56) References Cited

U.S. PATENT DOCUMENTS 6,504,575 B1  1/2003  Ramirez et al.
6,667,738 B2  12/2003  Murphy
(Continued)

OTHER PUBLICATIONS

De Novo Software, "Overlays," FCS Express 6 Manual, 2017. [retrieved on Jan. 9, 2018] Retrieved from the Internet: https://denovosoftware.com/site/manual/index.html?overlays.htm.

*Primary Examiner* — Nelson D. Hernández Hernández
(74) *Attorney, Agent, or Firm* — Davis Wright Tremaine LLP; Heather M. Colburn (57) ABSTRACT

A method and system for generating a sympathetic assistive mutation of a live camera image stream. A camera captures a digital video including a series of root images, at least one processor generates a series of mutated images, and a display device displays the series of mutated images as a preview of at least a portion of the series of root images. Each mutated image in the series of mutated images is generated by (a) obtaining the corresponding root image, which includes root pixels, (b) applying at least one of a function and a shader to the corresponding root image to obtain an assistive color for each of a portion of the root pixels, and (c) blending the assistive color with at least one color value of each root pixel in the portion of root pixels to thereby create the mutated image.

23 Claims, 4 Drawing Sheets (51) Int. Cl.
  *G06T 5/00* (2006.01)
  *H04N 5/232* (2006.01)
  *G06T 7/90* (2017.01)

(52) U.S. Cl.
  CPC ..... *H04N 5/23216* (2013.01); *H04N 5/23222* (2013.01); *H04N 5/23293* (2013.01); *H04N 9/77* (2013.01); *G06T 2207/10016* (2013.01); *G06T 2207/10024* (2013.01)

(58) Field of Classification Search
  CPC ........... H04N 5/23222; H04N 5/23216; H04N 5/23212; H04N 5/213; G06T 7/90; G06T 5/002; G06T 2207/10024; G06T 2207/10016
  See application file for complete search history.

(56) References Cited

U.S. PATENT DOCUMENTS

| | | |
|---|---|---|
| 6,724,351 B1 | 4/2004 | Boger |
| 8,701,020 B1 | 4/2014 | Fulcher et al. |
| 9,076,253 B2 | 7/2015 | Saunders |
| 9,117,395 B2 | 8/2015 | Kim et al. |
| 9,641,888 B2 | 5/2017 | Kerns et al. |
| 10,187,637 B2 * | 1/2019 | Cohen ................ H04N 5/23212 |
| 10,547,819 B2 * | 1/2020 | Cohen .................. H04N 5/2353 |
| 2003/0103062 A1 | 6/2003 | Lee et al. |
| 2003/0202015 A1 | 10/2003 | Battles et al. |
| 2004/0073935 A1 | 4/2004 | Kang |
| 2004/0223001 A1 | 11/2004 | Peng |
| 2006/0044328 A1 | 3/2006 | Rai et al. |
| 2015/0378558 A1 | 12/2015 | Smith et al. |

\* cited by examiner

SYMPATHETIC ASSISTIVE MUTATION OF LIVE CAMERA PREVIEW/DISPLAY IMAGE STREAM

CROSS REFERENCE TO RELATED APPLICATIONS

This application claims the benefit of U.S. Provisional Application No. 62/468,063, filed on Mar. 7, 2017, and U.S. Provisional Application No. 62/468,874, filed on Mar. 8, 2017, both of which are incorporated herein by reference in their entireties.

BACKGROUND OF THE INVENTION

Field of the Invention

The present invention is directed generally to video capture systems and more particularly, to methods of previewing digital video captured by such systems.

Description of the Related Art

Many image capture devices (e.g., video cameras) display images being captured (e.g., in a preview image) along with one or more informational or assistive overlay layers. Unfortunately, many platforms and applications continue to display these overlay layers on the preview image even when the user does not need the information. This causes an unnecessary negative impact on thermal life, battery life, and processing capabilities of the image capture devices.

DETAILED DESCRIPTION OF THE INVENTION

Figure 1:
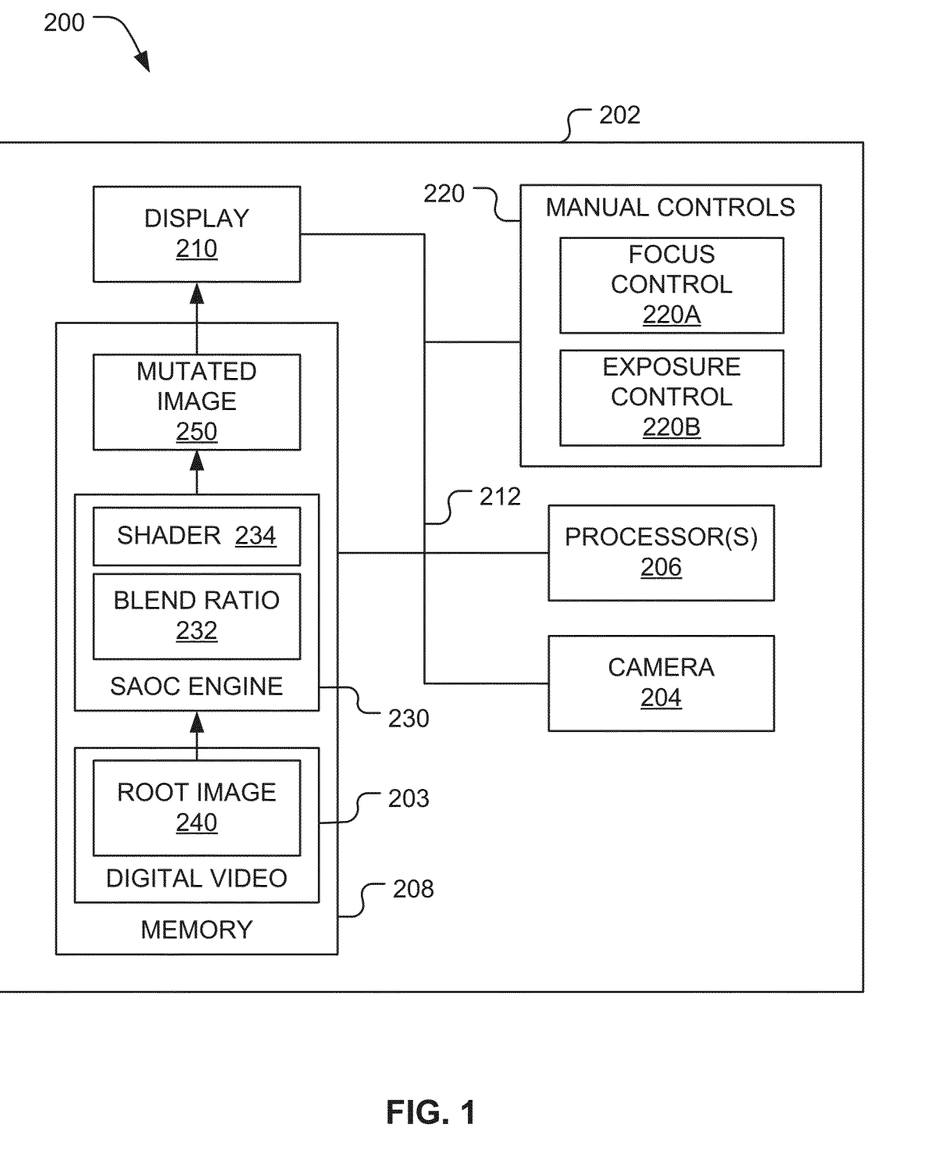
FIG. 1 is a functional block diagram of a video capture system.

FIG. 1 illustrates a video capture system 200 configured to capture digital video 203, which may be referred to as an image stream. For example, the digital video 203 may be captured and/or processed as a Real-Time Messaging Protocol ("RTMP") video stream. By way of a non-limiting example, the video capture system 200 may be implemented as a mobile communication device 140 (described below and illustrated in FIG. 4). The video capture system 200 includes a housing 202, a camera 204, one or more processors 206, memory 208, a display 210, and one or more manual controls 220. The camera 204, the processor(s) 206, the memory 208, and the display 210 may be connected together by a bus 212 (e.g., like a bus system 186 illustrated in FIG. 4).

The camera 204 is mounted on the housing 202. The camera 204 is configured to capture the digital video 203 and store that digital video 203 in the memory 208. The captured digital video 203 includes a series of root images (e.g., including a root image 240) of a scene. By way of a non-limiting example, the camera 204 may be implemented as a camera or video capture device 158 (see FIG. 4).

The processor(s) 206 is/are configured to execute software instructions stored in the memory 208. By way of a non-limiting example, the processor(s) 206 may be implemented as a central processing unit ("CPU") 150 (see FIG. 4) and the memory 208 may be implemented as memory 152 (see FIG. 4).

The display 210 is positioned to be viewed by the user while the user operates the video capture system 200. The display 210 is configured to display a preview of the digital video 203 being captured by the camera 204. By way of a non-limiting example, the display 210 may be implemented as conventional display device, such as a touch screen. The display 210 may be mounted on the housing 202. For example, the display 210 may be implemented as a display 154 (see FIG. 4). Alternatively, the display 210 may be implemented as an electronic viewfinder, an auxiliary monitor connected to the video capture system 200, and the like.

The manual control(s) 220 is/are configured to be operated by the user and may affect properties (e.g., focus, exposure, and the like) of the digital video 203 being captured. The manual control(s) 220 may be implemented as software controls that generate virtual controls displayed by the display 210. In such embodiments, the display 210 may be implemented as touch screen configured to receive user input that manually manipulates the manual control(s) 220. Alternatively, the manual control(s) 220 may be implemented as physical controls (e.g., button, knobs, and the like) disposed on the housing 202 and configured to be manually manipulated by the user. In such embodiments, the manual control(s) 220 may be connected to the processor(s) 206 and the memory 208 by the bus 212.

By way of non-limiting examples, the manual control(s) 220 may include a focus control 220A, an exposure control 220B, and the like. The focus control 220A may be used to change the focus of the digital video being captured by the camera 204. The exposure control 220B may change an ISO value, shutter speed, aperture, or an exposure value ("EV") of the digital video being captured by the camera 204.

The memory 208 stores a Sympathetic Assistive Overlay Composite ("SAOC") engine 230 implemented by the processor(s) 206. While the SAOC engine 230 includes the term "overlay" in its name, the SAOC engine 230 does not actually generate an overlay, which is a semi-transparent element or image displayed at the same time as and on top of an original image (e.g., the root image 240). Instead, the SAOC engine 230 generates a single mutated image 250 for each corresponding root image (e.g., the root image 240) within at least a portion of the digital video 203. The mutated image 250 is configured to help the user view specific information (e.g., contrast and exposure) with regard to the corresponding root image. Each mutated image 250 is displayed by the display 210, instead of the corresponding root image. Thus, the mutated image 250 is not the product of a multi-image composite.

The SAOC engine 230 generates the mutated image 250 for each of those of the series of root images captured when the user operates at least one of the manual control(s) 220 that affects the digital video 203 and for up to a predetermined amount of time (e.g., one second) after the user stops operating the manual control(s) 220. By way of non-limiting examples, the SAOC engine 230 may generate a focus-assist mutated image and/or an exposure-assist mutated image. The focus-assist mutated image may be displayed when the user is manipulating the focus control 220A and may fade away (or return to the root image) when the user disengages the focus control 220A. The exposure-assist mutated image may be displayed when the user is manipulating the exposure control 220B and may fade away (or return to the root image) when the user disengages the exposure control 220B.

Figure 2:
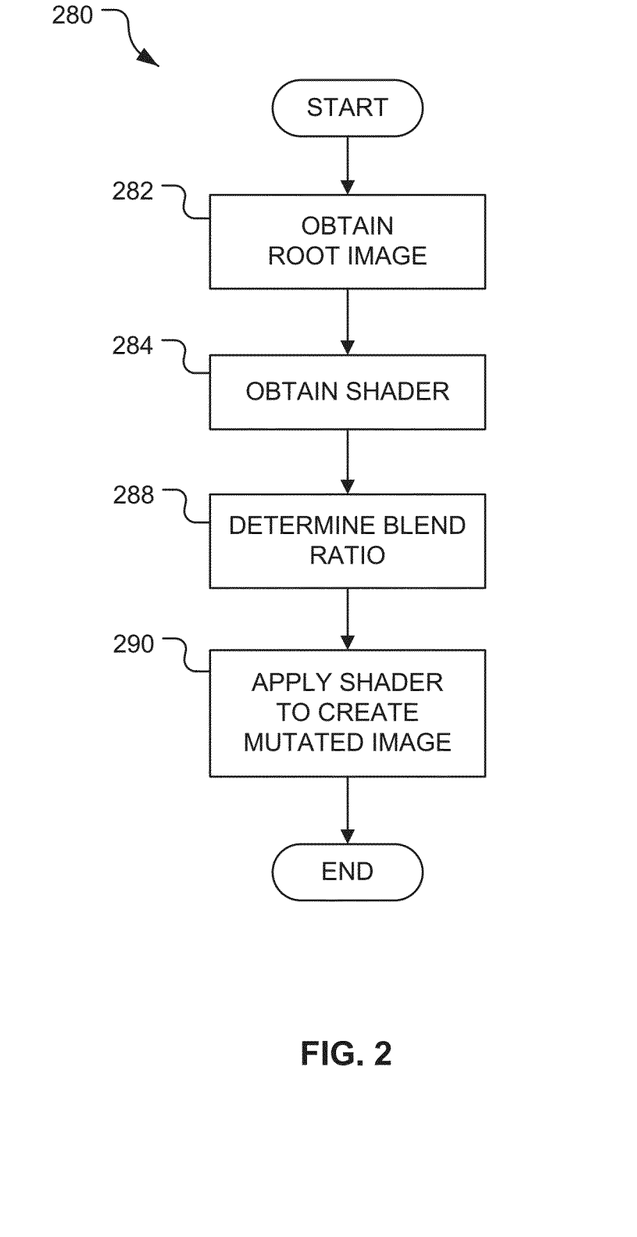
FIG. 2 is a flow diagram of a method of generating a mutated image performable by the video capture system.

FIG. 2 is a flow diagram of a method 280 performed by the SAOC engine 230 (see FIG. 1). Referring to FIG. 1, the method 280 (see FIG. 2) generates the mutated image 250 from one of the series of root images of the digital video 203. For ease of illustration, the method 280 (see FIG. 2) will be described as generating the mutated image 250 from the root image 240. In first block 282 (see FIG. 2), the SAOC engine 230 obtains the root image 240.

Then, in block 284 (see FIG. 2), the SAOC engine 230 generates, obtains, or selects a function (e.g., an image kernel function) or shader 234 configured to identify one or more assistive colors for each of at least a portion of the root pixels. The assistive color(s) illustrate one or more properties or features of the root image 240. For example, the shader 234 may identify assistive color(s) for the root pixels that represent edges (e.g., Edge Detection indicators), luminance (e.g., Luminance Threshold indicators), and the like. The assistive color(s) may each be implemented as a scalar, a floating-point value, and the like.

In block 288 (see FIG. 2), the SAOC engine 230 determines a blend ratio 232. For each mutated pixel in the mutated image 250, the blend ratio 232 determines how much the assistive color(s) will contribute to the mutated pixel and how much the corresponding root pixel of the root image 240 will contribute to the mutated pixel. The blend ratio 232 may be characterized as including first and second weights that sum to one. The assistive color(s) may each be weighted by the first weight and the root pixels may be weighted by the second weight.

The blend ratio 232 weights the assistive color(s) more when the user is manipulating the focus control 220A. For example, the first weight of the blend ratio 232 may have a maximum value and the second weight of the blend ratio 232 may have a minimum value when the user is manipulating the focus control 220A. The first weight is reduced (thereby increasing the contribution of the root pixels of the root image 240) over the predetermined amount of time (e.g., one second) after the user has stopped manipulating the focus control 220A. At the same time, the second weight of the blend ratio 232 is increased so that the first and second weights total one. For example, the first weight (or the contribution of the assistive color(s) to the mutated image 250) may be decreased linearly until the predetermined amount of time has expired at which time the first weight is equal to zero and the second weight is equal to one.

Next, in block 290 (see FIG. 2), the SAOC engine 230 applies the shader 234 to the root image 240 to obtain the assistive color(s) for at least a portion of the root pixels and blends (using the blend ratio) the assistive color(s) with the root pixels to create the mutated image 250. The shader 234 identifies the assistive color(s) for each root pixel to which the shader 234 is applied. However, the SAOC engine 230 may be configured to skip any of the root pixels that fail to satisfy visualization criteria. For example, the visualization criteria may include one or more predefined micro-contrast or exposure thresholds and the SAOC engine 230 may skip any of the root pixels that fail to satisfy the predefined threshold(s).

The function or shader 234 is applied to the root image 240 one root pixel at a time. As is apparent to those of ordinary skill in the art, a shader is a specialized computer function intended to efficiently modify a large group of numerical values in parallel. The shader 234 is applied to a particular root pixel of the root image 240 by first centering the shader 234 at the particular root pixel. The shader 234 has numerical values that correspond to those of the root pixels neighboring the particular root pixel. For example, if the shader 234 is a 3×3 matrix, the shader 234 will have a numerical value corresponding to each root pixel in a region of the root image 240 that includes nine root pixels and is centered at the particular root pixel. A function is used to obtain the assistive color(s) based on the numerical values of the shader 234 and values (e.g., colors, brightness, and the like) represented by the root pixels within the region of the root image 240. The result of the function is a feature or property value (e.g., edge(s), luminance, and the like) that is used to identify one or more of the assistive color(s) for the particular root pixel. The function may multiply the value of each of the root pixels in the region by the corresponding numerical value of the shader 234 to obtain a plurality of products and sum those products to obtain the feature or property value (e.g., edges, luminance, micro-contrast, brightness, and the like). The feature or property value is then used to determine the assistive color(s) for the particular root pixel. The assistive color(s) is/are each displayable as a grayscale level, a color, and the like.

For example, if the root pixel is in the RGB color space, the root pixel is composed of red, green, and blue color values. In this example, the red, green, and blue color values may be implemented as floating-point values ranging from zero to one. The following non-limiting example may be used to determine the final red, green, and blue color values for a particular mutated pixel in the mutated image 250. The particular mutated pixel replaces the corresponding root pixel in the root image 240. Thus, the root image 240 mutates into the mutated image 250. The shader 234 may replace the red, green, and blue color values of the root pixel with mutated color values created by blending the red, green, and blue color values of the root pixel with a first assistive color (e.g., red) when the brightness of the root pixel exceeds a maximum threshold value (e.g., 0.95 on a brightness scale that ranges from zero to one). Otherwise, no modification of the root pixel will take place. The shader 234 may replace the red, green, and blue color values of the root pixel with mutated color values created by blending the red, green, and blue color values of the root pixel with a second assistive color (e.g., blue) when the brightness of the root pixel is less than a minimum threshold value (e.g., 0.05 on the brightness scale that ranges from zero to one). Otherwise, no modification of the root pixel will take place. The shader 234 may replace the red, green, and blue color values of the root pixel with mutated color values created by blending the red, green, and blue color values of the root pixel with a third assistive color (e.g., green) when a micro contrast score obtained for the root pixel exceeds a micro contrast threshold (e.g., 0.3 on a micro contrast scale that ranges from zero to one). Otherwise, no modification of the root pixel will take place. The micro contrast score may be obtained for the root pixel using methods described in U.S. patent application Ser. No. 15/910,989, filed on Mar. 2, 2018, and titled Inductive Micro-Contrast Evaluation Method, which is incorporated herein by reference in its entirety. If the micro contrast score is evaluated last and the red, green, and blue color values of the root pixel were previously blended with either the first or second assistive colors, the red, green, and blue color values of the particular mutated pixel may be replaced (or overwritten) with the mutated color values created by blending the red, green, and blue color values of the root pixel with the third assistive color (e.g., green).

As explained above, the SAOC engine 230 blends the assistive color(s) with the root pixels of the root image 240 to obtain the mutated pixels of the mutated image 250. The assistive color(s) are blended with the root pixels by applying the first weight to each of the assistive color(s) and the second weight to each of the root pixels. Then, the weighted assistive color(s) are added to the weighted root pixels to obtain the mutated pixels, which replace the root pixels in the mutated image. Thus, for each root pixel, the assistive color(s) may be blended with the corresponding root pixel using a per-pixel linear-mix operation.

The mutated color values of the mutated pixels may be generated for the entire root image 240 using the same shader 234 and in a single pass. Thus, the SAOC engine 230 does not actively discriminate between spatial regions or sectors of the root image 240. All of the root pixels of the root image 240 are subject to the same processing path. However, as mentioned above, one or more of the root pixels may be skipped in block 290.

In the example described above, the mutated pixels store information that is relevant to the user when the user is operating the exposure control 220B. When the user is operating (or has just operated) the exposure control 220B, the SAOC engine 230 may blend the first assistive color (e.g., red) and/or the second assistive color (e.g., blue) into appropriate ones of the root pixels to obtain the mutated pixels of the mutated image 250. In this example, the mutated image 250 may be characterized as being the exposure-assist mutated image.

Similarly, the mutated pixels may store information that is relevant to the user when the user is operating the focus control 220A. When the user is operating (or has just operated) the focus control 220A, the SAOC engine 230 may blend the third assistive color (e.g., green) into the appropriate ones of the root pixels to obtain the mutated pixels of the mutated image 250. In this example, the mutated image 250 may be characterized as being the focus-assist mutated image.

Then, the method 280 (see FIG. 2) terminates.

Figure 3:
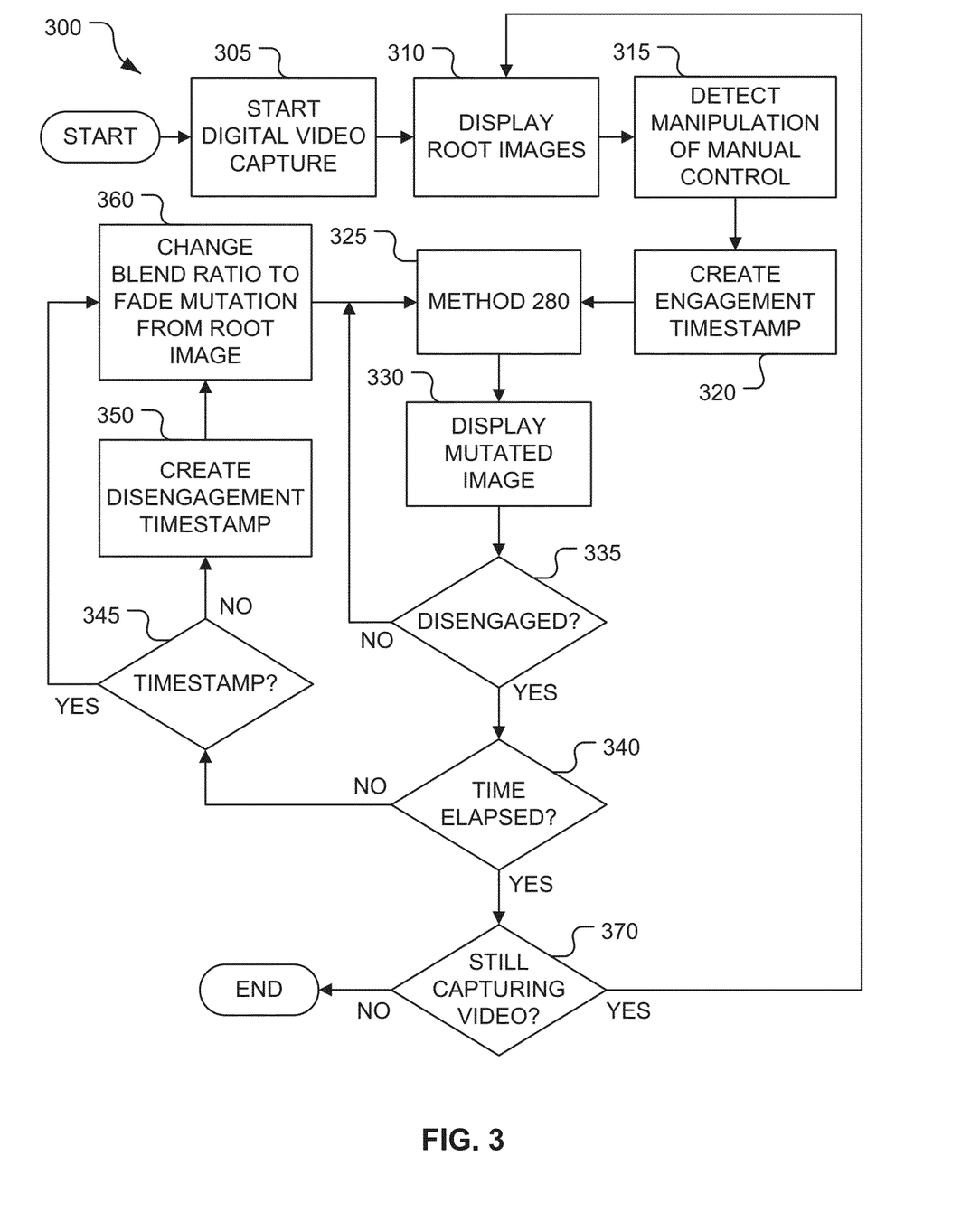
FIG. 3 is a flow diagram of a method performable by the video capture system during the capture of digital video.

FIG. 3 is a flow diagram of a method 300 performed by the SAOC engine 230 (see FIG. 1) during the capture of the digital video 203 (see FIG. 1). For ease of illustration, in the following description of the method 300, the user will be described as operating the focus control 220A (see FIG. 1). However, the method 300 may be performed when the user is operating the exposure control 220B (see FIG. 1), both the focus and exposure controls 220A and 220B, or any other manual control alone or in combination with any of the manual control(s) 220 (see FIG. 1).

In first block 305, the user begins capturing the digital video 203 using the video capture system 200 (see FIG. 1) and stores the captured digital video 203 in the memory 208 (see FIG. 1). Referring to FIG. 1, at this point, the SAOC engine 230 has not yet detected the user has manipulated one or more of the manual control(s) 220.

As mentioned above, the captured digital video 203 includes a series of root images. In block 310 (see FIG. 3), the SAOC engine 230 instructs the display 210 to display the series of root images as a preview of the captured digital video 203. Thus, the user is previewing the un-mutated digital video 203 as it is being captured.

Then, in block 315 (see FIG. 3), the SAOC engine 230 detects the user has manipulated one or more of the manual control(s) 220. For ease of illustration, in this example, the SAOC engine 230 detects the user has manipulated the focus control 220A.

Next, in block 320 (see FIG. 3), the SAOC engine 230 creates an engagement timestamp that logs the moment the user manipulated the focus control 220A.

In block 325 (see FIG. 3), the SAOC engine 230 performs the method 280 (see FIG. 2) to generate the mutated image 250. Then, in block 330 (see FIG. 3), the SAOC engine 230 displays the mutated image 250 in the display 210 as a preview of the root image 240. In this example, the mutated image 250 may be the focus-assist mutated image (described above), in which the green area(s) represent portions of the root image that have an adequate amount of micro-contrast and are considered to be in focus. The user may use this visual information to adjust the focus control 220A. When the exposure-assist mutated image (described above) is displayed, the red area(s) represent portions of the root image that are overexposed and the blue area(s) represent portions of the root image that are underexposed. The user may use this visual information to adjust the exposure control 220B. Optionally, the mutated image 250 may display red, blue, and green area(s). In such embodiments, the user may use this visual information to adjust the focus and/or exposure controls 220A and 220B.

In decision block 335 (see FIG. 3), the SAOC engine 230 determines whether the user has disengaged with the manual control(s) 220. Continuing the example from above, the SAOC engine 230 may determine the user has disengaged with the focus control 220A if the focus control 220A has not be adjusted for more than a threshold amount of time from the engagement timestamp. The threshold amount of time may vary based on a desired amount of dwell time. The decision in decision block 335 (see FIG. 3) is "YES," when the user has disengaged with the manual control(s) 220. Otherwise, the decision in decision block 335 (see FIG. 3) is "NO."

When the decision in decision block 335 (see FIG. 3) is "NO," the SAOC engine 230 returns to the block 325 (see FIG. 3) and performs the method 280 (see FIG. 2) again on the next root image in the digital video 203. Thus, while the user remains in contact with the manual control(s) 220 (e.g., the focus control 220A), the mutated image 250 is displayed to the user as the preview.

When the decision in decision block 335 (see FIG. 3) is "YES," the SAOC engine 230 advances to decision block 340 (see FIG. 3). In decision block 340 (see FIG. 3), the SAOC engine 230 determines whether the predetermined amount of time has elapsed since the user has disengaged with the manual control(s) 220 (e.g., the focus control 220A). The decision in decision block 340 (see FIG. 3) is "YES," when the predetermined amount of time has elapsed. Otherwise, the decision in decision block 340 (see FIG. 3) is "NO."

When the decision in decision block 340 (see FIG. 3) is "NO," the SAOC engine 230 advances to decision block 345 (see FIG. 3) and determines whether the SAOC engine 230 has created a disengagement timestamp that logs the moment (determined by the SAOC engine 230) that the user stopped manipulating the manual control(s) 220 (e.g., the focus control 220A). The decision in decision block 345 (see FIG. 3) is "YES," when the disengagement timestamp has been created. Otherwise, the decision in decision block 345 (see FIG. 3) is "NO."

When the decision in decision block 345 (see FIG. 3) is "NO," in block 350 (see FIG. 3), the SAOC engine 230 creates the disengagement timestamp that logs the moment (determined by the SAOC engine 230) that the user stopped manipulating the manual control(s) 220 (e.g., the focus control 220A). The predetermined amount of time may start at the time recorded in the disengagement timestamp. Then, the SAOC engine 230 advances to block 360 (see FIG. 3).

Referring to FIG. 3, when the decision in decision block 345 is "YES," the SAOC engine 230 (see FIG. 1) advances to block 360.

In block 360, the SAOC engine 230 (see FIG. 1) changes the blend ratio 232 (see FIG. 1) to fade the mutation(s) from the root image 240 (see FIG. 1) over the predetermined amount of time (e.g., about one second). Referring to FIG. 1, as explained above, the mutated color value(s) of the mutated image 250 is/are created by identifying assistive color(s) for each of at least a portion of the root pixels and, for each root pixel in that portion, using the blend ratio to blend the assistive color(s) identified for the root pixel with the color value(s) of the root pixel. In block 360 (see FIG. 3), the blend ratio 232 is modified based at least in part by the disengagement timestamp. The SAOC engine 230 may reduce the first weight (thereby increasing the contribution of the root pixels of the root image 240) over the predetermined amount of time after the user has stopped manipulating the focus control 220A. For example, the first weight (or the contribution of the assistive color(s) to the mutated image 250) may be decreased linearly until the predetermined amount of time has expired at which time the first weight is equal to zero and the second weight is equal to one.

Then, the SAOC engine 230 returns to block 325 (see FIG. 3). Thus, before the predetermined amount of time elapses, the SAOC engine 230 generates the mutated image 250 for each new root image 240 in the digital video 203 being captured. Therefore, in block 325 (see FIG. 3), the SAOC engine 230 performs the method 280 (see FIG. 2) on the next root image in the digital video 203.

When the decision in decision block 340 (see FIG. 3) is "YES," in decision block 370 (see FIG. 3), the SAOC engine 230 determines whether the user is still capturing the digital video 203 using the video capture system 200. The decision in decision block 370 (see FIG. 3) is "YES," when the user is still capturing the digital video 203. Otherwise, the decision in decision block 370 (see FIG. 3) is "NO." When the decision in decision block 370 (see FIG. 3) is "YES," the SAOC engine 230 returns to block 310 and displays the newly captured root images as a preview of the captured digital video 203. On the other hand, referring to FIG. 3, when the decision in decision block 370 is "NO," the method 300 terminates.

Referring to FIG. 1, the user's interest in each mutated image 250 is greatest when the user is operating one or more of the manual control(s) 220 that affect the captured digital video 203. Thus, when the user is no longer operating the one or more manual control(s) 220, the SAOC engine 230 continues to generate the mutated image 250 for the series of root images captured during the predetermined period of time (e.g., one second) but fades the mutated image 250 back to the root image 240 by adjusting the blend ratio 232. By fading the mutated image 250 back to the root image 240, the SAOC engine 230 eliminates the need to generate the mutated image 250 thereby reducing the negative impact of this computation on thermal life, battery life, and processing capabilities of the video capture system 200.

Because the manual control(s) 220 may include more than one manual control, the SAOC engine 230 may detect a second manual control (e.g., the exposure control 220B) has been operated after operation of a first manual control (e.g., the focus control 220A) has been detected. When this occurs, the SAOC engine 230 may create a second engagement timestamp that logs the moment the user manipulated the second manual control. The SAOC engine 230 may also generate the mutated image 250 based on the operation of both the first and second manual controls. In other words, the mutated image 250 may include first mutations that identify a first image property changed by the first manual control and second mutations that identify a second image property changed by the second manual control. For example, the mutated image 250 may include red, blue, and green area(s) that illustrate areas of the root image that are overexposed, underexposed, and have an adequate amount of microcontrast, respectively. The second engagement timestamp may be used to determine when the user has disengaged with the second manual control. Then, the SAOC engine 230 may create a second disengagement timestamp that the SAOC engine 230 may use to fade the second mutations from the root images over the predetermined amount of time. At the same time, the SAOC engine 230 may use the first disengagement timestamp to fade the first mutations from the root images over the predetermined amount of time.

In some embodiments, the SAOC engine 230 may generate and display the virtual controls implementing the manual control(s) 220. Alternatively, the manual control(s) 220 may be implemented by other software instructions stored in the memory 208.

Mobile Communication Device

Figure 4:
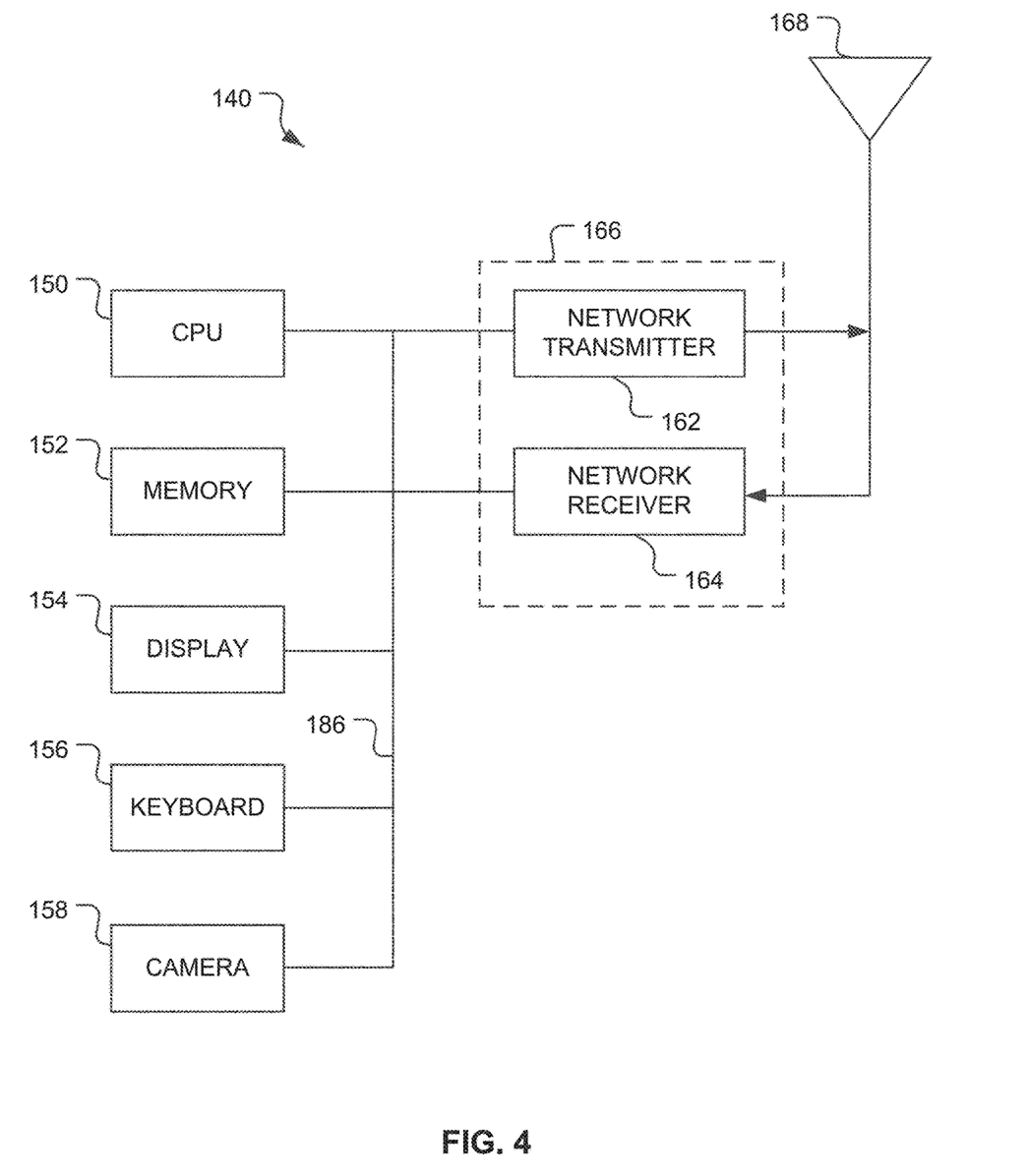
FIG. 4 is a functional block diagram illustrating an exemplary mobile communication device that may be used to implement the video capture system.

FIG. 4 is a functional block diagram illustrating a mobile communication device 140. The mobile communication device 140 may be implemented as a cellular telephone, smart phone, a tablet computing device, a self-contained camera module (e.g., a wired web camera or an Action Camera module), and the like. By way of a non-limiting example, the mobile communication device 140 may be implemented as a smartphone executing IOS or Android OS. The mobile communication device 140 may be configured to capture the digital video 203 (see FIG. 1) and process the digital video 203 as a RTMP protocol video stream.

The mobile communication device 140 includes the CPU 150. Those skilled in the art will appreciate that the CPU 150 may be implemented as a conventional microprocessor, application specific integrated circuit (ASIC), digital signal processor (DSP), programmable gate array (PGA), or the like. The mobile communication device 140 is not limited by the specific form of the CPU 150.

The mobile communication device 140 also contains the memory 152. The memory 152 may store instructions and data to control operation of the CPU 150. The memory 152 may include random access memory, ready-only memory, programmable memory, flash memory, and the like. The mobile communication device 140 is not limited by any specific form of hardware used to implement the memory 152. The memory 152 may also be integrally formed in whole or in part with the CPU 150.

The mobile communication device 140 also includes conventional components, such as a display 154 (e.g., operable to display the mutated image 250), the camera or video capture device 158, and keypad or keyboard 156. These are conventional components that operate in a known manner and need not be described in greater detail. Other conventional components found in wireless communication devices, such as USB interface, Bluetooth interface, infrared device, and the like, may also be included in the mobile communication device 140. For the sake of clarity, these conventional elements are not illustrated in the functional block diagram of FIG. 4.

The mobile communication device 140 also includes a network transmitter 162 such as may be used by the mobile communication device 140 for normal network wireless communication with a base station (not shown). FIG. 4 also illustrates a network receiver 164 that operates in conjunction with the network transmitter 162 to communicate with the base station (not shown). In a typical embodiment, the network transmitter 162 and network receiver 164 are implemented as a network transceiver 166. The network transceiver 166 is connected to an antenna 168. Operation of the network transceiver 166 and the antenna 168 for communication with a wireless network (not shown) is well-known in the art and need not be described in greater detail herein.

The mobile communication device 140 may also include a conventional geolocation module (not shown) operable to determine the current location of the mobile communication device 140.

The various components illustrated in FIG. 4 are coupled together by the bus system 186. The bus system 186 may include an address bus, data bus, power bus, control bus, and the like. For the sake of convenience, the various busses in FIG. 4 are illustrated as the bus system 186.

The memory 152 may store instructions executable by the CPU 150. The instructions may implement portions of one or more of the methods described above (e.g., the methods 280 and 300 illustrated in FIGS. 2 and 3, respectively). Such instructions may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A video capture system comprising:
    a display;
    a memory storing instructions implementing a mutation generating engine;
    a camera configured to capture digital video and store the digital video in the memory, the digital video comprising a series of root images; and
    at least one processor configured to execute the instructions implementing the mutation generating engine, the mutation generating engine being configured to generate a series of mutated images and display the series of mutated images in the display as a preview of at least a portion of the series of root images, a different mutated image in the series of mutated images corresponding to a different corresponding root image in the portion of the series of root images, each mutated image in the series of mutated images being generated by (a) obtaining the corresponding root image, the corresponding root image comprising root pixels, (b) applying at least one of a function and a shader to the corresponding root image to obtain an assistive color for each of a portion of the root pixels, and (c) blending the assistive color with at least one color value of each root pixel in the portion of root pixels to thereby create the mutated image.

2. The video capture system of claim 1, wherein the assistive color represents at least one of a level of exposure and an amount of micro-contrast in the portion of the root pixels of the corresponding root image.

3. The video capture system of claim 1, wherein the mutation generating engine is configured to display at least one manual control in the display,
    the at least one manual control is operable by a user, and
    the mutation generating engine is configured to generate the series of mutated images when the user operates the at least one manual control and for a predetermined amount of time after the user stops operating the at least one manual control.

4. The video capture system of claim 3, wherein the mutation generating engine uses a blend ratio to blend the assistive color with the at least one color value of each root pixel in the portion of root pixels, and
    the mutation generating engine is configured to adjust the blend ratio during the predetermined amount of time to reduce a contribution of the assistive color to the mutated image.

5. The video capture system of claim 4, wherein the contribution of the assistive color to the mutated image is reduced linearly during the predetermined amount of time with the contribution being eliminated completely at an expiration of the predetermined amount of time.

6. The video capture system of claim 3, wherein the at least one manual control comprises at least one of a focus control and an exposure control.

7. The video capture system of claim 1, further comprising:
at least one manual control operable by a user, the mutation generating engine being configured to generate the series of mutated images when the user operates the at least one manual control and for a predetermined amount of time after the user stops operating the at least one manual control.

8. The video capture system of claim 7, wherein the mutation generating engine uses a blend ratio to blend the assistive color with the at least one color value of each root pixel in the portion of root pixels, and
the mutation generating engine is configured to adjust the blend ratio during the predetermined amount of time to reduce a contribution of the assistive color to the mutated image.

9. The video capture system of claim 8, wherein the contribution of the assistive color to the mutated image is reduced linearly during the predetermined amount of time with the contribution being eliminated completely at an expiration of the predetermined amount of time.

10. The video capture system of claim 7, wherein the at least one manual control comprises at least one of a focus control and an exposure control.

11. The video capture system of claim 1, wherein the assistive color is a first assistive color,
the portion of the root pixels is a first portion of the root pixels,
the first portion of the root pixels comprises any of the root pixels having a brightness that exceeds a maximum threshold value,
applying the at least one of the function and the shader to the corresponding root image obtains a second assistive color for each of a second portion of the root pixels,
the second portion of the root pixels comprises any of the root pixels having a brightness that is less than a minimum threshold value, and
generating each mutated image in the series of mutated images further comprises blending the second assistive color with at least one color value of each root pixel in the second portion of root pixels.

12. The video capture system of claim 11, wherein applying the at least one of the function and the shader to the corresponding root image obtains a third assistive color for each of a third portion of the root pixels,
the third portion of the root pixels comprises any of the root pixels having a micro contrast score that exceeds a micro contrast threshold, and
generating each mutated image in the series of mutated images further comprises blending the third assistive color with at least one color value of each root pixel in the third portion of root pixels.

13. A method comprising:
capturing, with a camera, a digital video comprising a series of root images;
generating, with at least one processor, a series of mutated images, a different mutated image in the series of mutated images corresponding to a different corresponding root image in at least a portion of the series of root images, each mutated image in the series of mutated images being generated by (a) obtaining the corresponding root image, the corresponding root image comprising root pixels, (b) applying at least one of a function and a shader to the corresponding root image to obtain an assistive color for each of a portion of the root pixels, and (c) blending the assistive color with at least one color value of each root pixel in the portion of root pixels to thereby create the mutated image; and
displaying, on a display device, the series of mutated images as a preview of the portion of the series of root images.

14. The method of claim 13, wherein the assistive color represents at least one of a level of exposure and an amount of micro-contrast in the portion of the root pixels of the corresponding root image.

15. The method of claim 13, further comprising:
detecting, with the at least one processor, that a user has operated at least one manual control affecting one or more properties of a portion of the digital video captured after the operation of the at least one manual control, the series of mutated images not being generated until after the at least one processor detects the user has operated the at least one manual control.

16. The method of claim 15, further comprising:
recording, with the at least one processor, an engagement timestamp when the user operated the at least one manual control.

17. The method of claim 15, further comprising:
determining, with the at least one processor, that the user has stopped operating the at least one manual control.

18. The method of claim 17, further comprising:
recording, with the at least one processor, a disengagement timestamp when the at least one processor determines the user has stopped operating the at least one manual control.

19. The method of claim 18, wherein a blend ratio is used to blend the assistive color with the at least one color value of each root pixel in the portion of root pixels, and the method further comprises:
adjusting, with the at least one processor, the blend ratio to reduce a contribution of the assistive color to the mutated image after the at least one processor determines the user has stopped operating the at least one manual control.

20. The method of claim 19, further comprising:
eliminating the contribution of the assistive color to the mutated image after a predetermined amount of time from the disengagement timestamp has elapsed.

21. The method of claim 15, wherein the at least one manual control comprises at least one of a focus control and an exposure control.

22. The method of claim 13, wherein the assistive color is a first assistive color,
the portion of the root pixels is a first portion of the root pixels,
the first portion of the root pixels comprises any of the root pixels having a brightness that exceeds a maximum threshold value,
applying the at least one of the function and the shader to the corresponding root image obtains a second assistive color for each of a second portion of the root pixels,
the second portion of the root pixels comprises any of the root pixels having a brightness that is less than a minimum threshold value, and
generating each mutated image in the series of mutated images further comprises blending the second assistive color with at least one color value of each root pixel in the second portion of root pixels.

23. The method of claim 22, wherein applying the at least one of the function and the shader to the corresponding root image obtains a third assistive color for each of a third portion of the root pixels,     the third portion of the root pixels comprises any of the root pixels having a micro contrast score that exceeds a micro contrast threshold, and     generating each mutated image in the series of mutated images further comprises blending the third assistive color with at least one color value of each root pixel in the third portion of root pixels.

\* \* \* \* \*